United States Patent

[11] 3,538,964

[72] Inventors Edward C. Warrick
 Pittsburgh, Pennsylvania;
 Emerson Berends, Tupelo, Mississippi
[21] Appl. No. 684,437
[22] Filed Nov. 20, 1967
[45] Patented Nov. 10, 1970
[73] Assignee Rockwell Manufacturing Company
 Pittsburgh, Pennsylvania
 a corporation of Pennsylvania

[54] MOTOR DRIVEN TABLE SAW
 10 Claims, 13 Drawing Figs.
[52] U.S. Cl. .................................................. 143/36
[51] Int. Cl. .................................................. B27b 5/24
[50] Field of Search ........................................... 143/36,
 169, 132(Cur), 33—35, 36+; 83/(Inq.)

[56] References Cited
 UNITED STATES PATENTS
2,695,638 11/1954 Gaskell ........................ 143/36
2,945,516 7/1960 Edgemond et al. ........... 143/36
2,974,693 3/1961 Goldschmidt et al. ........ 143/36X
 FOREIGN PATENTS
 205,623 10/1923 Great Britain ................ 143/35

Primary Examiner—Donald R. Schran
Attorney—Strauch, Nolan, Neale, Nies & Kurz

ABSTRACT: A tilting arbor table saw with tilt bracket and blade arbor raising and lowering controls, a tilt scale, and mitre gage adjustment controls and angle scale grouped and arranged for operation and viewing by an operator standing in operating position at the front of the saw. Table blade opening closure plate means is provided for levelling adjustment from above the work table by the operator standing in operating position and a motor end bell provided with a radially offset blade arbor mount is directly journaled in the tilt bracket for rotational movement to effect raising and lowering adjustment of the blade through a self locking worm pinion meshing with a worm segment fixed to the motor housing carried by the motor end bell.

3,538,964

MOTOR DRIVEN TABLE SAW

BACKGROUND

This invention relates to tilting arbor bench saws and mitre gages provided as accessory equipment therewith. Representative prior art directed to concentrically related control mechanisms for such saws comprises U.S. Pat. Nos. 2,619,997, 2,695,638 and 2,844,173 to W. L. Gaskell, 2,558,829 to F. D. Dolan, 2,810,408 to W. B. Boice et al., 2,852,047 to W. H. Odlum et al., 2,945,516 to J. W. Edgemond, Jr. et al. and 3,011,529 to W. G. Copp. Representative prior art directed to adjustable table inserts comprise U.S. Pat. Nos. 2,750,970 and 2,873,773 to W. L. Gaskell, 2,776,682 to L. C. Mullen and 2,810,412 to G. A. Roug. Representative mitre gage prior art comprises U.S. Pat. Nos. 1,164,253 to A. G. Borntraeger, 2,356,610 to H. F. Penney and 2,873,773 to W. L. Gaskell.

SUMMARY

A primary object of the present invention resides in providing a tilting arbor saw with a simplified tilt bracket for directly mounting the drive motor and arbor assembly, the tilt and arbor raising and lowering controls, and tilt gage operating cam pin beneath the table, a tilt gage mounted beneath the work support table in operating juxtaposition to the operating cam pin and a tilt gage viewing opening in the work support table arranged to permit the operator to grasp the controls and view the tilt gage from a standing position in front of the table saw while operating the controls.

A further important object of the present invention is to provide a tilting arbor saw of the preceeding object with an improved mitre gage having an angle scale and a primary angle stop member respectively viewable and operable from the standing position in front of the table saw.

Still another object of the present invention is to provide a tilt bracket for a tilting arbor saw with a cylindrical journal opening and to incorporate the saw blade arbor in a motor end bell directly mounted in the cylindrical journal opening for angular adjustment therein to effect raising and lowering movement of the saw blade arbor and associated blade with respect to the work support table.

A further object of the present invention resides in directly mounting the tilt and arbor raising and lowering controls in the form of concentric geared shaft means on a side face of the tilt bracket and providing respective gear racks on the table support base and the motor housing for operative cooperation with the respective geared shaft means, the gear shaft means and rack for the raising and lowering control being in the form of a self-locking worm shaft pinion and cooperating rack segment.

A still further object of the present invention resides in the provision of a mitre gage comprising a guide bar, a mitre gage body pivoted to the guide bar and including a workpiece abutment wall providing a vertical laterally directed workpiece engaging wall and an arcuate flange carried by the abutment wall in spaced overhanging relation to the guide bar and providing an arcuate clamping edge, upwardly facing graduated angle scale, and dependent stop lugs at the midpoint and 45° angle points of the scale, and a clamp block and stop assembly fixed to the guide bar in operative juxtaposition to the arcuate flange including a stop plate selectively movable from a stop position beneath the arcuate flange to an inoperative position beyond the flange edge, a clamp plate having an end portion overlying the arcuate flange, and a clamp stud and knob assembly fixed to the guide bar with the stud shank passing freely upwardly through the clamp block, stop plate, and clamp plate and threadingly receiving the clamp knob for securing the stop plate in a selected one of its positions and clamping the clamp plate against the arcuate flange to fix the mitre gage body in a selected angular position.

A further object of the present invention resides in providing the work support table with a blade opening in laterally centered overlying relation to the saw blade arbor and a tilt gage viewing opening forwardly in said work support table in axial centered relation to said blade opening, pivotally mounting a tilt angle indicator scale to the base of the table saw for movement past the viewing opening in response to the adjusted position of the tilt bracket and its gage operation cam pin, and mounting a lens having an indexing mark therein positioned in the viewing opening with said indexing mark in axial alignment with the center of the blade opening to cooperate with the tilt angle indicator scale.

Still another object of the present invention resides in providing the support table blade opening with peripherally spaced, inwardly extending, support ears having tapped bores therein, providing a removable insert plate having a blade slot therein and securing screw openings aligned with the tapped bores of the support ears for closing the support table blade opening and compressible bushings interposed between the support ears and insert plate adapted, upon inserting securing screws through the plate openings and threading them into the tapped bores of the support ears, to permit levelling of the table insert with the work support surface of the saw table.

BRIEF DESCRIPTION OF THE DRAWINGS

Other objects will appear from the appended claims and following description when read in conjunction with the accompanying drawings wherein:

DESCRIPTION OF THE PREFERRED EMBODIMENT

Figure 1:
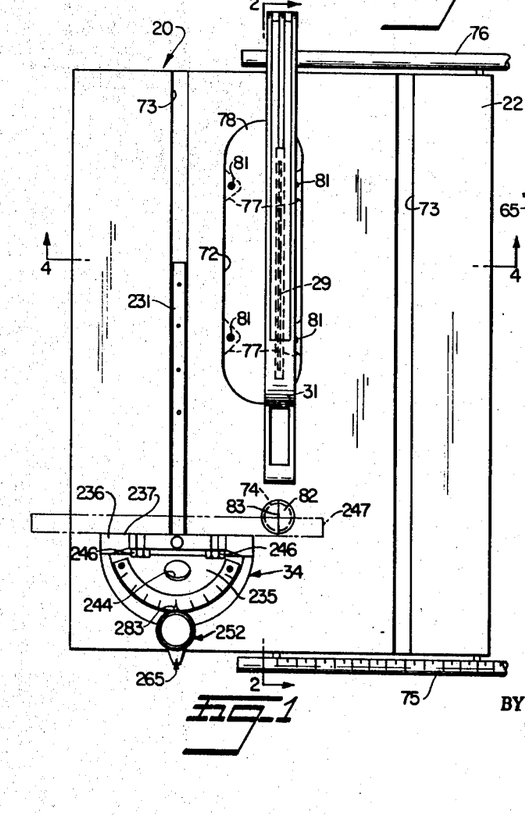
FIG. 1 is a top plan view of a saw embodying the present invention.
Figure 2:
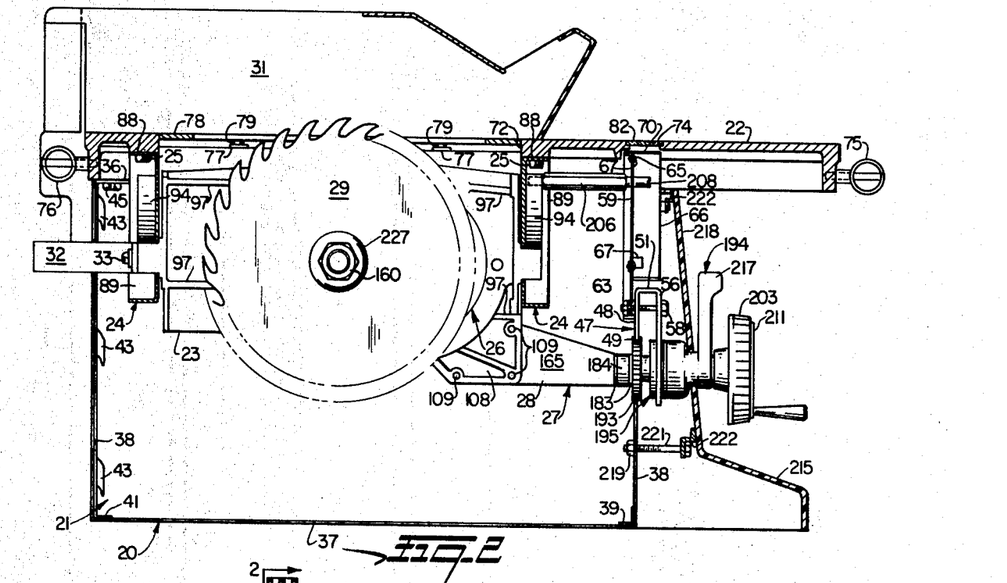
FIG. 2 is a sectional view of the saw of FIG. 1 taken substantially on line 2-2 of FIG. 1.
Figure 3:
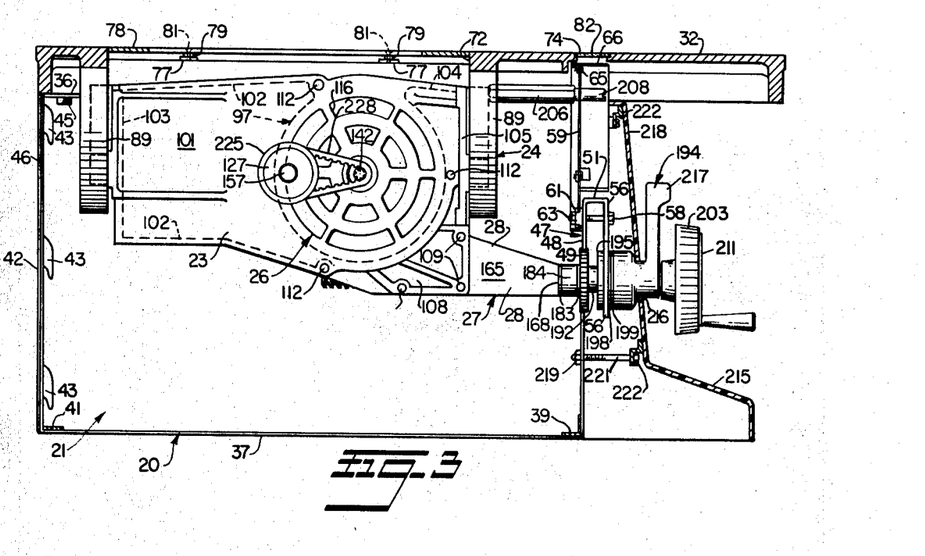
FIG. 3 is a sectional view similar to FIG. 2 with the saw blade removed to better illustrate the drive connection between the motor shaft and blade supporting arbor shaft.
Figure 4:
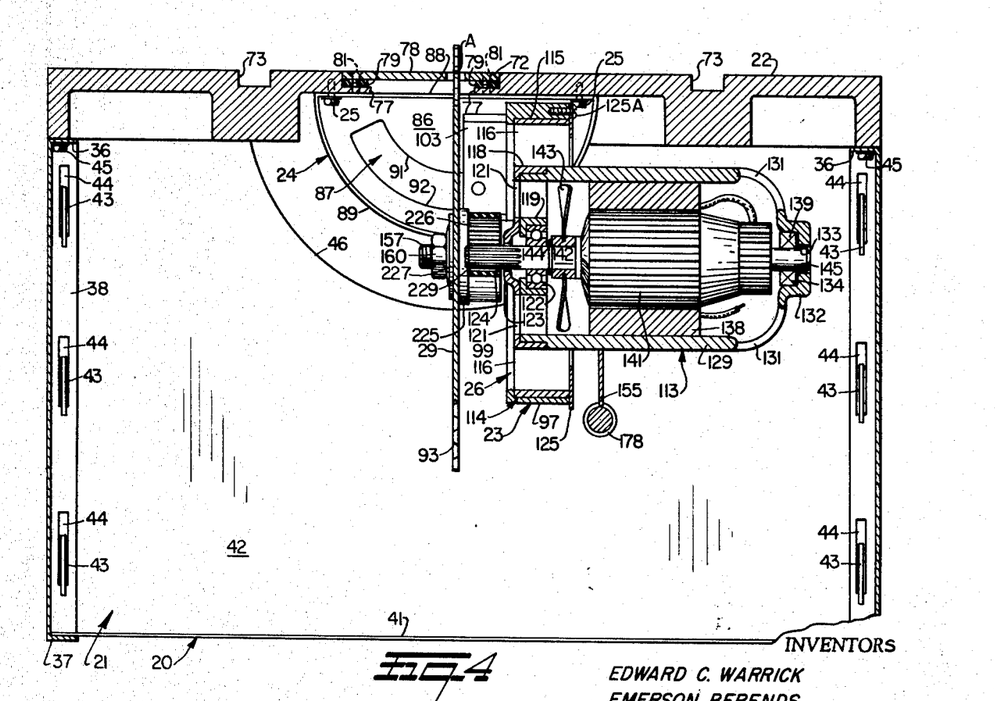
FIG. 4 is a sectional view of the saw of FIG. 1 taken substantially on line 4-4 of FIG. 1.
Figures 8, 9, 10:
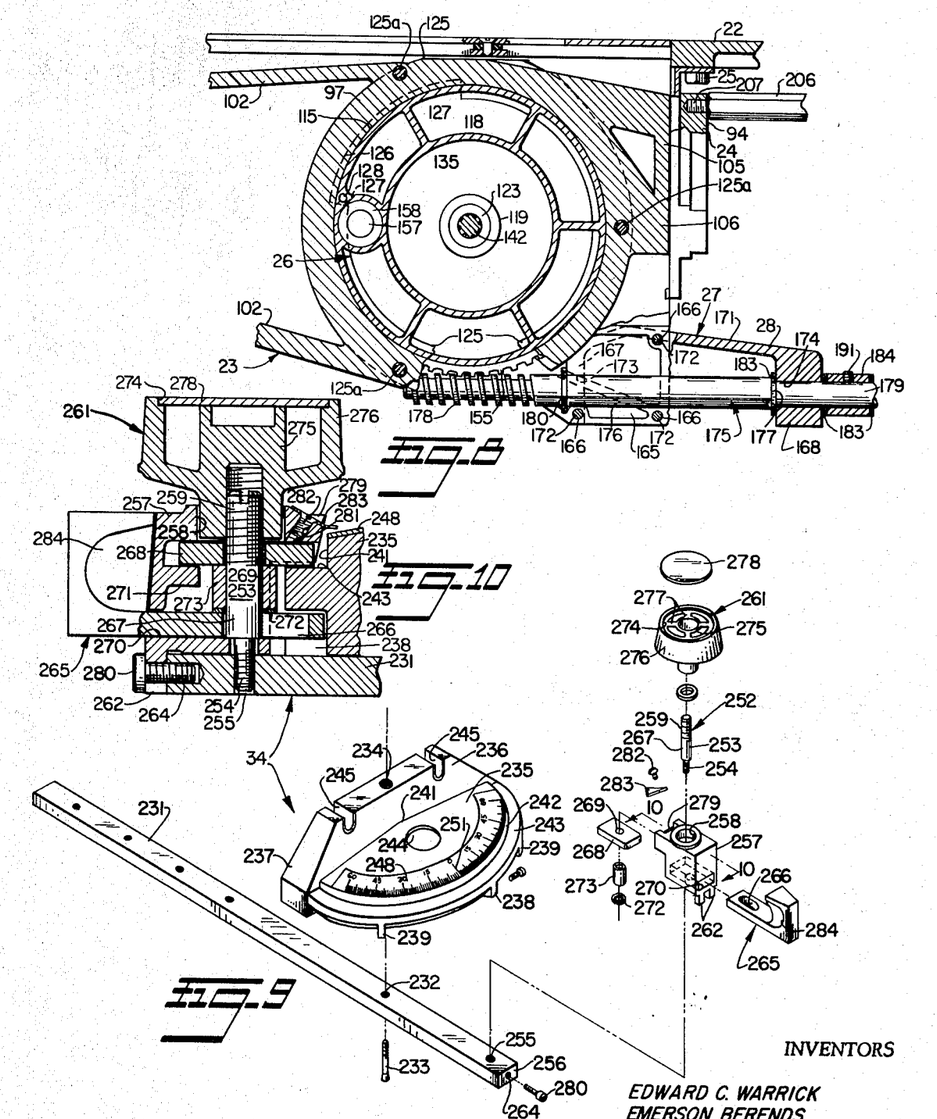
FIG. 8 is an enlarged fragmental sectional view taken on line 2-2 of FIG. 1 with a portion of the tilt support bracket broken away to illustrate the mounting of the main shaft of the tilt and blade and arbor means raising and lowering control means and its cooperation with the gear segment fixed to the electric motor housing.
FIG. 9 is an exploded view of the mitre gage of the present invention.
FIG. 10 is a fragmental longitudinal sectional view illustrating the cooperation of the mitre gage clamp block.

With continued reference to the drawings wherein like reference numerals are used throughout the several views of the drawings to indicate the same parts, the tilting arbor saw 20 of the present invention is principally composed of a support base or cabinet assembly 21 having a work support table 22 bolted thereto, a tilt bracket 23 suspended from table 22 by front and rear trunnions 24 bolted to lands formed on the table underside by bolts 25 (FIGS. 2 and 4) for tilt movement around tilt axis A (FIG. 4), a blade and arbor means 26 journalled in tilt bracket 23, tilt and raising and lowering control means 27 fixed to a side wall of tilt bracket 23 through a control shaft support bracket 28, a circular saw blade 29, a pivotally mounted saw blade guard assembly 31 carried by a support bracket 32 bolted at 33 (FIG. 2) to the rear end of tilt bracket 23, and a mitre gage assembly 34 (FIGS. 1, 9 and 10). As best shown in FIGS. 2, 3 and 4 support base or cabinet assembly 21 is made up of a spaced pair of side plates 35 having inturned top flanges 36, inturned bottom flanges 37, inturned end flanges 38 cross connected in opposed space relation by an angle bar 39 extending between the front ends of bottom flanges 37, a strap member 41 extending between the rear ends of bottom flanges 37 and a rear closure plate 42 interconnected to the rear end flanges 38 through L-shaped vertically spaced hangers 43 interfitted into vertical slots 44 formed in rear end flanges 38. Work support table 22 is bolted at the front and rear ends of top flanges 36 by bolts 45, the rear bolts only being shown in FIGS. 2, 3 and 4. As best seen in FIGS. 2, 3 and 4, rear closure plate 42 at its upper center is provided with an arcuate cutout portion 46 through which the blade guard support bracket 32 extends.

Figure 11:
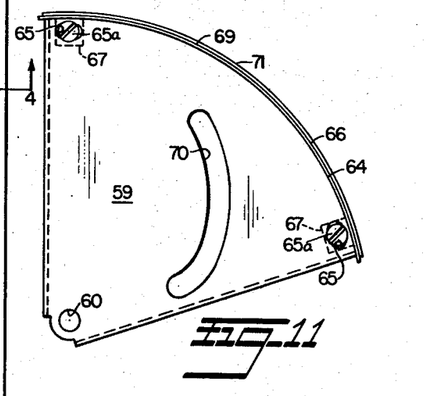
FIG. 11 is a detailed view of the tilt or bevel scale assembly provided by the present invention.

The front end of support base or cabinet assembly 23 is spanned about midway of its height by a bracket member 47 bolted at its ends to inturned front end flanges 38 and composed of a back wall 48 formed at its center portion to provide an arcuate downwardly facing rack gear segment 49 (FIGS. 2 and 3) having axis A as its center and along its upper edge with a forwardly directed cross flange 51 carrying a dependent wall section 56 arcuately slotted at 57 opposite and below gear segment 49 using axis A as a center for a purpose to be presently pointed out. Dependent wall section 56 and back wall 48 at a point laterally centered with respect to their ends to lie in the vertical plane containing axis A and above slot 57 are provided with aligned passages to freely pass a cap screw 58 the inner shank end of which pivotally mounts a segment plate 59 (FIG. 11) having a journal bore 60 through a sleeve bushing 61 and a retainer assembly including an abutment washer 62 and a nut 63. Segment plate 59, as will appear from FIG. 11, is of generally triangular configuration in plan, has an arcuate edge 64 opposite journal bore 60 and is provided at its other two corners with arcuately shaped screw slots 65 adapted to receive mounting screws 65a for securing a generally arcuate tilt or bevel scale platen 66 in abutting relation to edge 64 through securing ears 67 struck out of platen 66. The upper face of platen 66 has a bevel scale plate 71 secured thereto and segment plate 59 is provided with a cam slot 70 for a purpose to be hereinafter pointed out.

Work support table 22, as best seen in FIG. 1, is provided with the customary through blade opening 72, a respective mitre gage groove 73 at each side of blade opening 72 extending parallel to the long axis of blade opening 72 from the front edge to the rear edge of the table, and a through stepped circular sight opening 74 forwardly of blade opening 72 to be over tilt scale 70 in laterally centered relation on the tilt axis of the saw hereinafter described. The front and rear edges of the work support table are suitably drilled and tapped in customary manner to mount front and rear guide rails 75 and 76 for mounting a rip fence (not shown). Rail 75, as seen in FIG. 1, is conventionally graduated to provide a scale for accurately setting the rip fence in well known manner. Blade opening 72 is provided along its side edges near the bottom table face with inwardly directed, tapped ears 77 for supporting a blade opening closure insert plate 78 of conventional construction. To assure proper levelling of insert plate 78 with the adjacently related table surface, the present invention employs compressible rubber bushings 79 interposed between ears 77 and the underside of insert plate 78 in surrounding relation to counter sunk securing screws 81 entered downwardly through screw openings provided in insert plate 78 into tapped ears 77. As a consequence of this use of simple, inexpensive rubber bushings and downwardly directed screws 81, insert plate 78 can be fully and accurately assembled from the top of work support table 22 merely by entering screws 81 through the respective plate screw openings, the respective rubber bushings and threading them into ears 77 to compress the bushings until the upper plate surface is drawn down into the blade opening until flush with the work table surface as determined by the eye, the touch, or sliding a test block back and forth across insert plate 78. If insert plate 78 is found to be too high or too low at any point, a simple tightening or loosening of the adjacently related screw or screws 81 can be effected to adjust its level as may be necessary. Stepped sight opening 74 is fitted with a transparent lens plate 82 having an index mark 83 extending diametrically thereof to cooperate with the tilt or bevel scale 71 in reading the tilt angle of the saw blade as will be more fully hereinafter explained. Since it is not necessary to remove lens plate 82 to adjust the tilt scale, it is preferably factory fitted to assure its being level with the work support surface of table 22 and permanently fixed in sight opening 74 by suitably cementing or other means.

As best seen in FIGS. 2 and 4 trunnions 24, comprise one piece stampings providing a planar wall 86 arcuately slotted at 87 and a continuous edge flange right angularly related to wall 86 composed of a planar mounting flange portion 88 apertured to receive bolts 25 to secure the trunnions to table 22 and a depending arcuate flange portion 89. Arcuate slots 87 are respectively dimensioned in a radial direction to provide radially spaced elongated arcuate wall portions 91 and 92 formed as a part of a circle having as a radius the distance between the tilt axis "A" (FIG. 4) which comprises the line of intersection between the plane of the work support surface of table 22 and the median plane of saw blade 93. The respective lower wall portions 92 of trunnions 24 form tracks or rails for slidably suspending tilt bracket 23 from the underside of table 22 through arcuate trunnion protrusions 94 provided on the respective end walls of tilt bracket 23 and of complemental arcuate configuration to but of shorter length than slots 87 to assure that relative vertical movement between trunnions 24 and tilt bracket 23 is prevented (See FIG. 6). To prevent relative axial movement between tilt bracket 23 and trunnions 24, the bases of protrusions 94 are peripherally enlarged to form abutment lands 95 which slidably bear upon the slot defining portions of the opposing faces of the respective trunnion walls 86. As a consequence, tilt bracket 23 is positively constrained to bodily shifting movement around tilt axis "A" to thereby vary the included angle between work support table 22 and all portions of tilt bracket 23 and any structure carried thereby.

Figures 5, 6, 7, 12, 13:
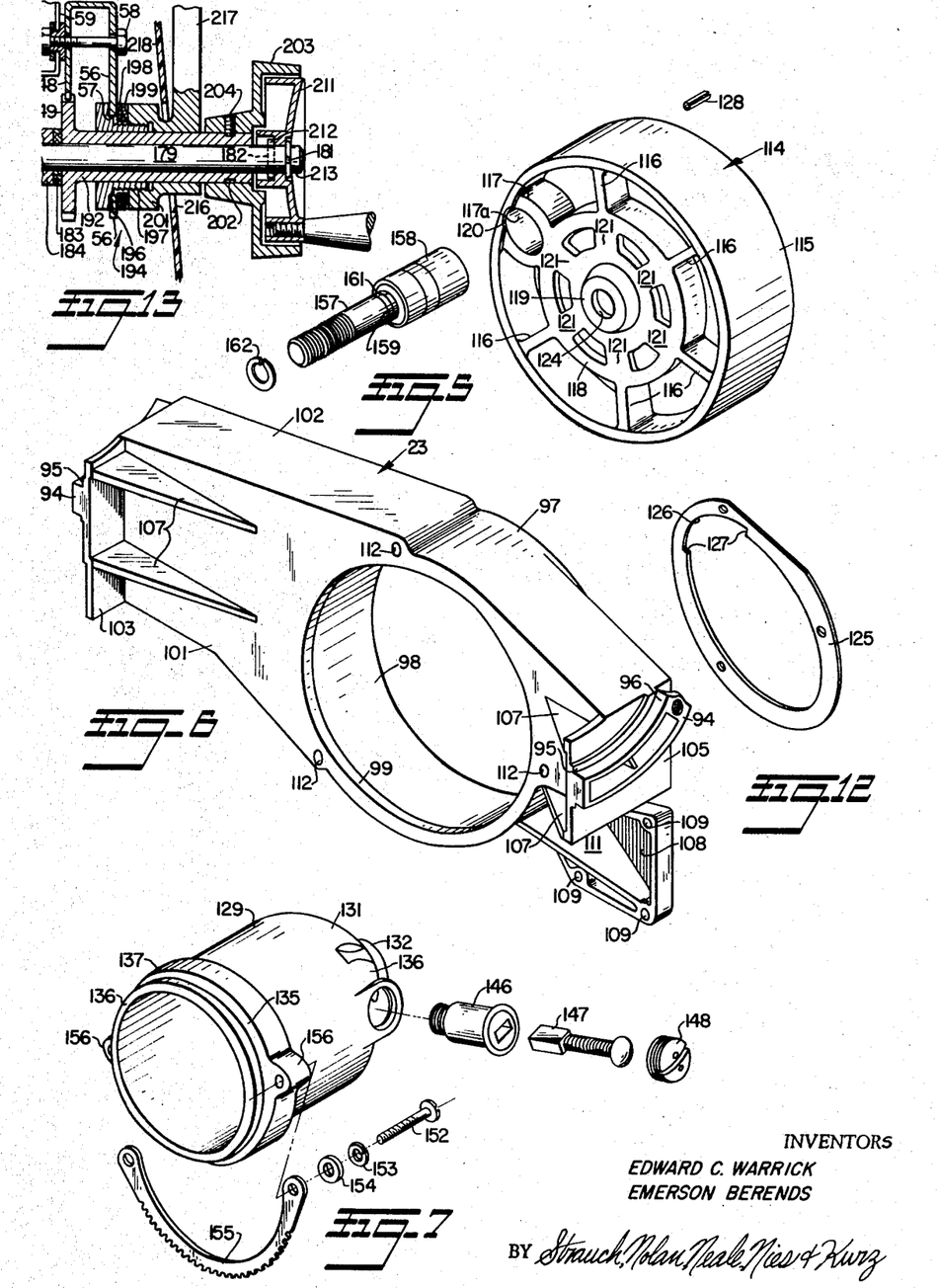
FIG. 5 is an exploded view of the motor end bell and arbor shaft support member and the blade arbor and arbor bearing means carried thereby.
FIG. 6 is a perspective view of tilt bracket detailing the front trunnion structure thereof and the lateral through opening for journaling the end bell of FIG. 5.
FIG. 7 is an exploded view of the electric motor housing and its brush assembly and the gear segment associated therewith and forming a part of the blade and arbor means raising and lowering control means.
FIG. 12 is a detailed perspective view of the retainer ring employed to secure the motor end bell and arbor shaft support member in assembled relation in the journal bore of the tilt bracket.
FIG. 13 is an enlarged fragmental sectional view illustrating the tilt and blade raising and lowering control shaft assembly.

As best shown in FIGS. 3, 6 and 8, tilt bracket 23 comprises a one piece casting comprising a cylindrical housing portion 97 having a stepped journal bore 98 therethrough forming at one end of bore 98 an inwardly directed annular abutment flange 99 (FIGS. 4 and 6) which constitutes in effect an extension of outwardly converging planar wall 101 extending away from one side of bore 98 and carrying right angularly related, upper and lower flanges 102 (FIGS. 6 and 8) and terminating in a right angularly related end wall 103 (FIG. 3) and extending away from the other side of housing 97 and carrying a short right angularly related upper flange 104 and a depending end wall 105 terminating slightly below the tapped ear 106. Suitable reinforcing webs 107 connect wall 101 and the trunnion bearing end walls 103 and 105 of tilt bracket 23 to reinforce the wall portions which extend beyond wall 101.

Tilt bracket 23 adjacent the lower right-hand quadrant of bore 98 as viewed in FIGS. 2, 3 and 6 and at the face of housing 97 opposite wall 101 is provided with an integrally formed, outwardly directed, rearwardly flanged, mounting pad 108 having three tapped corner bores 109 reinforced along its back wall by an integral web 111. Through tapped bores 112 are formed in ear 106 and housing 97 at 120° intervals around bore 98 for a purpose which will now be described in detail.

Referring to FIGS. 4, 5 and 7, electric motor 113 includes a separately mounted motor end bell and arbor shaft support member 114 (FIG. 5) having a cylindrical rim 115 dimensioned to provide a journalled fit in bore 98 of housing 97, five inwardly directed spokes 116 and a journal boss 117 equiangularly spaced around the inside of rim 115 and terminating radially inwardly thereof in an annular ring formation 118, and a hub portion 119 carried by angularly spaced spider arms 121 centered with respect to spokes 116 and journal boss 117. As best seen in FIG. 4, spokes 116, journal boss 117, and a motor mounting ring formation 118 extend axially from one end of rim 115 to a point about midway of the length of rim 115, boss 117 has a through bore 117a radially disposed to cut into rim 115 as indicated at 120, spider arms 121 have a minimal axial thickness and are located at said one end of rim 115, and hub portion 119 is axially coextensive with ring formation 118 and is provided with a multistepped through bore forming from right to left in FIG. 4 a seat for the front rotor shaft bearing 122, an outer bearing race abutment shoulder 123, and a rotor shaft opening 124. End bell and arbor shaft support member 114, with arbor shaft and arbor shaft bearing assembly hereinafter described in detail in place, is held in assembled relation in bore 98 for journalled movement as hereinafter pointed out by a retainer ring 125 (FIGS. 4, 8 and 12) secured to housing 97 by three cap screw and lock washer assemblies 125a (FIGS. 4 and 8) threaded into tapped bores 112 of housing 97. Retainer ring 125 as best seen in FIGS. 8 and 12 is provided along its inner peripheral edge with an approximate 90° arcuate recess 126 the opposite ends 127 of which form limit stops for cooperation with the protruding end of a roll pin 128 (FIG. 5) force fitted in a blind bore (not shown) provided in the rearmost face of rim 115 angularly adjacently related to the clockwise edge of journal boss 117 as seen in FIGS. 5 and 8. The protrusion of roll pin 128 is correlated so the protruding end face does not extend a substantially greater distance than the thickness of ring 125. The radial width of ring 125 is selected to exceed the combined thickness of rim 115 (FIG. 8) and the cylindrical wall of housing 97 and its inner edge, except in the area of arcuate recess 126 where the inner edge of the narrowed portion is radially outwardly disposed to clear roll pin 128, extends slightly inwardly of rim 115 for a purpose to be presently pointed out.

Motor housing 129 (FIGS. 4 and 7) at one end is provided with radial spider arms 131 (preferably six equiangularly spaced) supporting a centered hub portion 132 having a concentrically related shaft bore 133 extending axially inward into an enlarged annular recess forming a bearing seat 134 while the other end is open and defined by an annular, axially directed mounting flange 135 dimensioned to enter into motor mounting ring formation 118 and provides an axially inwardly spaced annular abutment shoulder 137 (FIG. 7) disposed to abut the rear end face of ring formation 118 when assembled as shown in FIG. 4. Motor housing 129 mounts stator windings 138 fixed to motor housing 129 in conventional manner, rear shaft bearing 139 mounted in seat 134, and rotor assembly 141 including shaft 142 with fan 143 fixed thereon by split ring 144 entered through stator winding 138 to dispose the rear end 145 of shaft 142 in bearing 139 prior to assembly with end bell and arbor shaft support member 114. Opposing brush holders 146, brushes 147, and brush securing caps 148 are likewise preassembled in the diametrically opposed tapped housing openings 151 immediately after rotor assembly 141 is inserted in housing 129. The front rotor shaft bearing 123 being in place in seat 122 of member 114, motor housing 129 with its rotor assembly 141 and brush assembly 146, 147 and 148 in place is assembled with end bell and arbor shaft support member 114 by entering shaft 142 into front shaft bearing 123 and axially moving motor housing 129 and the assembled motor parts toward housing 97 until shaft 142 protrudes through rotor shaft opening 124 and annular mounting flange 135 is fully inserted into ring formation 118 to abut flange end face 136 with the opposing end face of ring formation 118. Housing 129 is then fixed to member 114 by means of a pair of long cap screws 152 passed through lock washers 153, washer 154, the end apertures of elevating worm gear segment 155 (FIG. 7), the diametrically opposed ears 156 formed on housing 129 and threaded into blind tapped bores (not shown) in the rear face of ring formation 118 all located radially inwardly of retainer ring 125.

Arbor shaft 157 is preassembled with arbor bearing 158 by passing the plain end of shaft 157 containing retainer ring groove 159 through bore 161 of arbor bearing 158 to expose ring groove 159 at the rear end of bearing 158 and inserting split retainer ring 162 (FIG. 5) in groove 159. Arbor shaft 157 is thereby fixed against axial disassembling movement forwardly in arbor shaft bearing 158. Shaft bearing 158 of the preassembled arbor shaft and bearing assembly is preferably dimensioned to snugly fit bore 117a and is a length just equal to the axial dimension of rim 115 and is mounted in bore 117a prior to assembly of end bell and arbor shaft bearing support member 114 in bore 98 of tilt bracket 13. Upon assembly of member 114 with arbor shaft and arbor shaft bearing in place into bore 98 from the rear of tilt bracket 13, arbor shaft 157 will pass inwardly of flange 99 to project forwardly from housing 97 and the front end face of rim 115 and the arcuate segment of the outer race of bearing 128 lying within the notch 120 of rim 115 will engage the inner radial face of flange 99 to retain member 114 and bearing 158 against forward axial movement respecting tilt bracket 23. Attachment of retainer ring 125 is then effected by passing it forwardly around motor housing 129 into position against the rear face of housing 97 and the rear face portion of the outer race of bearing 158, which protrudes rearwardly from bore 117a in notch 120 to the rear edge of rim 115, and threading screws 125a home in tapped bores 112 of housing 97. Ring 125, due to its end butting engagement with the rear face of rim 115 and the rear face portion of the outer race of bearing 128, retains member 114 and bearing 128 against rearward axial movement respecting tilt bracket 23. Arbor shaft 157 is fixed against axial movement with respect to bearing 158 by the blade drive pulley and clamping assembly upon tightening clamp nut 160 as will be more fully hereinafter described. To assure free angular adjusting movement of member 114 together with the arbor shaft and arbor shaft bearing carried in bore 117a, a running clearance is provided between the end faces of rim 115 and the outer bearing race of bearing 128 on the one hand and flange 99 and ring 125 on the other hand by appropriate axial dimensioning of rim 115, bearing 158, and journal bore 98.

With member 114 mounted in tilt bracket 23 as just described and carrying motor casing 129 and the arbor shaft and arbor shaft bearing assembly, in fixed relative position as heretofore described, worm gear segment 155 will be disposed beneath motor casing 129 in close rearwardly spaced relation to the rear face of tilt bracket 23 and its dependent mounting pad 108 and the arbor shaft will lie parallel to the coincident axes of bore 98 and member 114 for 90° clockwise movement between its normal lowered position approximately as shown in FIGS. 2, 3 and 8 to its maximum raised position determined by uppermost limit stop 127 shown in FIG. 8.

Tilt bracket mounting pad 108 mounts on its planar back face lying in the plane of the rear face of cylindrical housing 97 an elongated control shaft support bracket 28 of generally channel configuration in cross section which comprises a planar mounting wall 165 (FIGS. 2, 3 and 8) formed at its inner left end as seen in FIG. 8 with three through screw openings 166 spaced to cooperate with tapped bores 109 of pad 108, respective end walls 167 and 168, and respective sloping top reinforcing walls 169 and 171 integrally joined to the top edges of walls 165, 167 and 168. Suitable cap screws 172 passing freely through screw openings 166 and threaded into tapped bores 109 of pad 108 fixedly secure support bracket 28 to pad 108 with its end wall 168 spaced beyond pad 108 toward the open front end of base or cabinet assembly 21. Referring particularly to FIG. 8, it will be noted that end walls 167 and 168 are provided with respective axially spaced coaxial through bores 173 and 174, bore 174 having a lesser diameter than bore 173. These coaxially arranged bores serve as journal bores for a main control shaft 175 having an enlarged diameter portion 176 extending from a shoulder 177 formed at the juncture with a reduced diameter portion 179 and dimensioned to extend from the inner face of end wall 168 to a free end formed to provide a worm pinion 178 meshed with worm segment 155 vertically below the coincident axes of motor housing 129, member 114 and bore 98. Shaft portion 176 is provided with a ring groove 180 axially spaced from shoulder 177 a distance slightly less than the spacing between the outer face of end wall 167 and the inner face of end wall 168 so a fibre wear washer 183 may be disposed in light abutting contact with shoulder 177 and the inner face of end wall 168 to assure free rotation of shaft 175 in its journal bores.

The reduced diameter portion 179 extends from shoulder 177 through journal bore 174 to a point well beyond the open front end of base or cabinet assembly 21 and is provided at its free end with a ring groove 181 (FIG. 13) and an axially inwardly spaced through bore 182 adapting it to mount an adjusting hand wheel to be presently described. Shaft 175 is fixed against relative axial movement with respect to support bracket 28 by a second fibre wear washer 183 and a set collar 184 assembled on reduced shaft portion 179 from its free end into light bearing contact with the outer face of end wall 168 and the opposing end face of collar 184 which is fixed to shaft 175 by tightening set screw 191. The reduced shaft portion 179 is then provided with a third fibre wear washer 183 and a sleeve shaft 192 (FIG. 13), including integral spur gear wheel 49, is journaled on shaft portion 179 in subjacent meshing engagement with gear segment 48 of bracket member 47. As best seen in FIG. 13, sleeve shaft 192 terminates inwardly of through bore 182 of shaft portion 179 and mounts a clamp assembly 194 made up of a flanged clamp sleeve 195 including a reduced diameter noncircular formation 196 dimensioned to slidingly cooperate with slot 57 of bracket member 47 and fix clamp sleeve 195 against free relative rotation on sleeve shaft 192 and a cylindrical threaded shank 197 passing freely through slot 57 to receive wear washer 198 and a wavy spring washer 199 held in place by the internally threaded hub of lock lever 201 threaded on shank 197. The end of sleeve shaft 192 projecting beyond the hub of lock lever 201 is annularly grooved at 202 and mounts an annularly flanged tilt hand wheel 203 which is nonrotably fixed to sleeve shaft 192 by a set screw 204 engaged in groove 202. Clockwise rotation of lever 201 advances the hub of lever 201 axially along clamp sleeve 195 to yieldingly clampingly engage wall 56 of bracket member 47 between the clamping flange of clamp sleeve 195 and washer 198 through the intermediary of spring washer 199 and the abutting end face of the hub of clamp lever 201 to arrest tilt movement of bracket 23 relative to base or cabinet assembly 23 and table 22 at any selected angular adjustment through shaft 175 and support bracket 28 carried by tilt bracket 23. When a tilt adjustment is to be made lever 201 is rotated in a counterclockwise direction to relieve the clamp pressure and tilt hand wheel 203 is rotated in the desired direction to rotate sleeve shaft 192 and its integral gear wheel 49 meshing with stationary gear segment 48 to traverse gear wheel 49 along gear segment 48 to shift sleeve shaft 192, main control shaft 175, support bracket 28, and tilt bracket 23 as a unit around tilt axis A to the desired angular adjustment determined by reading tilt scale plate 71 through lens plate 82 of table sight opening 74. Corresponding movement of tilt scale plate 71 is assured through the provision of a cam drive pin 206 (FIGS. 2, 3 and 8) having one end fixedly threaded into tapped bore 207 provided in the adjacently related trunnion protrusion 94 formed on the end of tilt bracket 23 and its other end in the form of a cylindrical tip 208 drivingly extending through cam slot 70 of pivoted segment plate 59. Zeroing adjustment of scale plate 71 may be effected by setting tilt bracket 23 to dispose blade 29 at right angles to the work support surface of the table 22 determined by the application of a carpenter's hand square to the table and blade, loosening the securing screws 65a fastening bevel scale platen 66 to segment plate 59, shifting platen ears 67 and screws 65a along screw slots 65 of segment plate 59 until a zero reading is obtained viewing scale plate 71 through lens plate 82, and tightening screws 65a to fix platen 66 and segment plate 59 against relative movement. Since main control shaft 175 journals in sleeve shaft 192 and support bracket 27 and due to its nonreversible worm drive connection to worm gear segment 155 is self locking in any selected tilted position of the tilt bracket 23 and saw blade 29, it will be appreciated that blade raising and lowering movement can be effected at anytime merely by grasping and turning adjusting handwheel 211 nonrotatably and axially fixed to the reduced diameter end of shaft 175 by a roll pin 212 carried in shaft through bore 182 with its ends protruding into axial blind end grooves formed in the hub bore of handwheel 211 and snap ring 213 in shaft ring groove 181.

Assembly of hand wheels 203 and 211 is effected after front cover assembly 215 containing arcuate slot 216 is slipped over the free forward ends of shafts 175 and 192 to dispose the reduced diameter hub of lock lever 201 in forwardly protruding position in arcuate slot 216 with its lever arm 217 disposed to swing back and forth in front of the rearwardly inclining cover wall 218. Hex headed thread cutting screws 219 passing freely through the inturned end flanges 38 of cabinet side plates 35 at laterally aligned points below bracket member 47 and elongated spacer sleeves 221 and threaded into through apertures in angle tabs 222 spot welded to the inner face of wall 218 fix cover assembly 215 to side plates 35.

Blade 29 and shaft 157 are clamped to the inner race of arbor bearing 158 between snap ring 162 and clamp nut 160 by abutting the blade side faces between the clamp flange 225 of splined pulley sheave 226 (FIGS. 3 and 4) and clamp plate or flange 227. A spacer washer (not shown) is preferably interposed between the inner end face of pulley sheave 226 and the opposed end face of the inner race of bearing 158 to assure adequate running clearance between pulley sheave 226 and flange 99 of tilt bracket 23. A positive drive belt 228 encompassing the pulley sheave 226 and the splined end 229 of rotor shaft 142 provides a direct drive connection between rotor shaft 142 and arbor shaft 157 and blade 29. By suitably relating the diameter of pulley sheave to the diameter of the splined end of rotor shaft 142, a desired rotating speed of blade 29 is obtained. Since the motor, arbor assembly and blade, and the blade raising and lowering controls and tilt controls are all directly carried by the tilt bracket 23 and compactly fixedly related around tilt bracket bore 98, an unusually accurate and rigid saw assembly conveniently arranged for adjustment and operation from a standing position at the front of the saw is provided by the structure so far described. This convenience of adjustment and operation is furthered by the mitre gage construction which will now be described in detail.

Referring principally to FIGS. 1, 9 and 10, the mitre gage 34 carried in one or the other of table grooves 73 comprises a slide or guide bar 231 dimensioned to closely slidingly fit in grooves 73 with its top face flush with the work support surface of table 22 and drilled inwardly from one end at 232 to freely receive pivot screw 233 with its shank protruding upwardly from the plane of the top surface of bar 231 and threaded into tapped bore 234 of mitre gage body 235 to pivotally connect body 235 to bar 231. Body 235 includes an upstanding wall portion 236 providing a planar work engaging face 237 right angularly related to the plane of the bar top surface and the work support surface of table 22 and an arcuate segment 237 integrally formed on the face of wall portion 236 opposite face 237 adjacent the base of wall portion 236 using the pivot axis of screw 233 as a center. The rim of segment 237 is undercut to form a dependent rib 238, and two dependent ribs 239 located respectively in clockwise and counterclockwise disposed relation to a plane containing the pivot axis of screw 233 and the longitudinal centerline of bar 231 at 45 percent intervals clockwise and counterclockwise from rib 238 for a purpose to be presently pointed out. The upper face of segment 237 slopes radially away from a point 241 on the opposite face of wall portion 236 determined by a vertical plane containing the longitudinal centerline of bar 231 to an arcuate vertical wall 242 inset from the peripheral edge of segment 237 to form an inwardly extending arcuate clamp surface 243 coextensive with the peripheral edge of segment 237. A circular laterally centered recess 244 may be provided in the sloping top wall of segment for receiving an identification disc bearing the manufacturer's name and trademark.

The upper edge of wall portion 236 at opposite sides of the aforesaid plane is provided with respective upwardly opening slots 245 parallel to the aforesaid plane. Grooves 245 have straight vertical sides and are adapted to receive the shanks of clamp bolts or screws 246 threaded into a jig fixture, preferably in the form of an elongated wooden block 247 (see dot-dash lines FIG. 1), conventionally provided by the user to increase the lateral dimension of the work engaging wall where workpieces of great length are to be cut. Due to the straight sided grooves the jig fixture can be assembled or disassembled on mitre gage body 235 with screws 246 in place therein merely by loosening screws 246 to back the screw heads away from their clamping position against the opposite face of wall portion 236 and lifting the fixture with screws 246 in place vertically, an impossibility in the conventional prior art structures where the walls of the screw holes partially or completely encircle the screws. The sloping face of arcuate segment 237 contiguous to arcuate shoulder 241 mounts an arcuate scale plate 248 graduated in degrees to angles of 60° in both directions from a zero indexing mark 251 lying in the aforesaid parallel plane.

Mitre gage body 235 is normally fixedly secured to bar 231 by a clamp assembly 252 fixed to the end of bar 231 adjacent the edge of arcuate segment 237 and shown in detail in FIGS. 9 and 10. Clamp assembly 252 comprises an upstanding stud 253 having a reduced diameter threaded end 254 threaded into tapped bore 255 provided in bar 231 inwardly from its end 256, an internally ribbed, open ended clamp block 257 having a stepped through vertical bore 258 therein to freely receive the upstanding threaded shank end 259 of stud 253 and the hub portion of an internally threaded knurled clamp nut 261 threaded onto stud shank end 259, dependent laterally spaced ears 262 abuttingly engaging the end face 256 of bar 231 at opposite sides of tapped bore 264, a slide stop member 265 having a body portion slidably received in rectangular opening 270 of block 257 and slotted at 266 to freely slidingly pass the unthreaded shank portion 267 of stud 253, and an elongated clamp plate 268 apertured at 269 to freely pass stud 253 and supported in vertically upwardly spaced relation to slide stop member 265 above inwardly extending rib 271 of block 257 with its innermost end clearing rib 271 by a wear washer 272 and spacer bushing 273 interposed between the upper face of slide stop member 265 and the underface of clamp plate 268 in surrounding relation to the shank of stud 253. Spacer bushing 273 is axially dimensioned so that its upper end face will protrude slightly above the upper face of rib 271 when assembled in position on wear washer 272 to assure a tight clamping of slide stop 265 and the mitre gage body 235 upon tightening of knurled knob to force the outer free end of clamp plate 268 against the arcuate clamp surface 243 of mitre gage body 235 (FIG. 10). As best seen in FIGS. 9 and 10, knurled knob 261 is annularly recessed at 274 and formed with an inset hub portion 275 joined to knurled rim 276 by spider arms 277 to conserve material and lighten the nut and is preferably closed by a snap-in insert plate 278 of any suitable material. A headed machine screw 280 threaded into tapped bore 264 engages the dependent ears 262 to fix block 257 against shifting movement relative to bar 231 and stud 253.

Referring particularly to FIG. 10, the upper end of block 257 overlying clamp surface 243 of mitre gage body 235 is notched at 279 to provide an outwardly and downwardly sloping bottom wall drilled and tapped at 281 to receive an attachment screw 282 for adjustable fixing a pointer 283 having a tip overlying scale plate 248 to cooperate with the angle indicia formed thereon. Angular adjustment of mitre gage assembly 34 is readily effected by an operator standing in normal operating position at the front of saw 20 as heretofore pointed out by loosening knurled knob 261 to release the clamping pressure on clamp plate 268 and grasping mitre gage body 253 and pivoting it around pivot screw 233 to register pointer 283 with the desired graduation on scale plate 248 and tightening knurled knob 261. Since scale plate 248 slopes downwardly toward the operator, precise adjustment to the desired angle may be visibly effected from a normal standing position. In event counterclockwise pivoting movement to the frequently used 45° position to the right in FIG. 1 is desired slide stop member 265 may be employed merely by leaving it in its innermost position as shown in FIG. 10 and pivoting body 235 until rib 239 at the right of rib 238 abuts the opposing side face of slide stop member 265. Return movement to the normal ninety degree cutting position shown in FIG. 10 is likewise effected by clockwise pivoting movement of body 235 until rib 238 abuts the opposite opposing side face of slide stop member 265. In event counterclockwise angular adjustment beyond the 45° angular position is desired or clockwise angular adjustment beyond the normal 90° position is desired, the operator, after loosening knurled knob 261, grasps the finger hold portion 284 of slide stop member 265 and pulls outwardly to shift slide stop member 265 to the left as seen in FIG. 10 until the opposite end of slot 266 engages stud 253. In this position the inner end of slide stop member 265 will be withdrawn from beneath the rim of segment 237 to a position clearing ribs 238 and 239 freeing mitre gage body 235 for free pivoting movement in either direction. The opposite 45° angular adjustment can be rapidly effected by first withdrawing slide stop member 265 to clear rib 238 and then returning it to its innermost position so the opposite rib 239 will abut the side face of slide stop member 265 employed in setting the mitre gage 34 to its 90° cutting position.

It will be appreciated from the foregoing description that the tilt angle adjustment of the blade, raising and lowering of the blade, and angular cutting adjustment of the mitre gage from the operator's normal standing position at the front of the saw are made possible by this invention with equal facility as well as adjustment of the rip fence to determine accurate ripping widths of the work piece in conventional manner and visual reading of the blade tilt scale, the mitre gage angle scale and the rip fence scale.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An improved table saw comprising a support base; a work support table mounted on said base and provided with a fore and aft elongated blade opening therethrough, trunnion supported bracket means mounted beneath said work support table to tilt with respect to said work support table around an axis lying in the plane of said work support table surface along the line of intersection of the saw blade with said plane, said trunnion supported bracket means comprising a main body having front and rear laterally directed trunnion protrusions thereon and an annular laterally directed opening lying between said trunnion protrusions; blade and arbor support means directly mounted on said bracket for raising and lowering movement with respect to said work support table, said blade and arbor support means comprising an electric motor end bell journaled in said laterally directed opening and provided with 1. a radially offset bearing seat mounting the outer race of an arbor shaft bearing carrying an arbor shaft in its inner race fixedly mounting a saw blade thereon between a flanged axially splined pulley belt sheave and clamp plate and nut assembly, 2. a coaxial motor shaft opening passing therethrough and 3. a motor rotor shaft, having a splined end, journaled in said motor shaft opening of said motor end bell, said splined rotor shaft end and said splined pulley sheave being drivingly connected by a positive drive belt; support bracket tilt and blade arbor and blade raising and lowering control means directly mounted on said bracket means and comprising shaft means extending in a fore and aft direction and terminating forwardly of said support base in respective concentrically related hand operated adjustment wheels whereby an operator standing in normal operating position at the front of said table may effect operation of said adjustment wheels to effect depth of cut and tilt angle adjustments of said blade.

2. The saw of claim 1 wherein said work support table is provided with a through sight opening formed in the work support table forwardly of said blade opening and laterally centered on the tilt axis of the saw; tilt angle scale means moveable in response to tilting movement of said bracket means is pivoted to said support base in subjacent juxtaposition to said sight opening to expose said tilt angle scale means to view through said sight opening; a mitre gage groove paralleling said tilt axis is formed in said table at least at one of said blade opening; and a mitre gage assembly is slidably mounted in said mitre gage groove and includes a slide bar, a pivoted body carried by said bar and having a flange of arcuate configuration mounting an arcuate upwardly and forwardly facing scale means whereby an operator in said standing position at the front of said table saw to operate said adjustment wheels may also visually determine the blade tilt angle and the angle of cut of a workpiece to be fed to said blade.

3. The saw of claim 1 wherein said electric motor has a worm gear segment fixed to its housing; and said shaft means of said raising and lowering control means is provided with a worm drive pinion meshing with said worm gear segment whereby said motor and motor end bell may be rotated in said laterally directed support bracket opening upon hand operation of its associated adjustment wheel to shift said blade and arbor shaft between lowermost and uppermost positions around the axis of said rotor shaft to effect raising and lowering of said blade through said blade opening of said work support table.

4. The saw of claim 1 wherein said support bracket tilt and blade arbor raising and lowering control means comprises a shaft support bracket fixed to a side of said supported bracket means and having fore and aft spaced shaft journal seats, a main control shaft journaled in said shaft journal seats with its rear end extending rearwardly beyond said shaft support bracket into juxtaposition to said blade and arbor support means and terminates in a worm drive pinion and with its front end extending forwardly from said shaft support bracket beyond said support base, a spacer collar fixed to said main shaft in end abutting relation to the forward end of said shaft support bracket, a sleeve shaft journaled on a portion of said extending front shaft end in end abutting relation to said spacer collar and includes a rack gear pinion disposed in juxtaposition to a portion of said support base, respective adjustment hand wheels fixed to the extreme forward ends of said sleeve shaft and said main shaft for independently rotating said respective shafts; a worm gear segment is fixedly secured to said blade and arbor support means in meshing engagement with said worm drive pinion to effect raising and lowering movement of said blade arbor means when said main control shaft hand wheel is rotated; and segment gear rack means is provided in laterally extending relation to said support base in meshing engagement with said rack gear pinion to effect tilting movement of said support bracket, said blade and arbor support means, and said shaft support bracket and control means as a unit around said tilt axis to vary the angular relation thereof with respect to said work support table when said sleeve shaft hand wheel is rotated.

5. The saw of claim 2 wherein said sight opening is provided with a lens closure plate including an index mark lying in the plane of said tilt axis permitting the operator in said standing position to accurately set the tilt angle of the blade in accord with the readings of said scale means.

6. The saw of claim 2 wherein said mitre gage assembly includes an upstanding stud fixed to said slide bar in adjacently spaced relation to said pivoted body and a clamp block assembly fixed to said slide bar in straddling relation to said stud and including a vertically movable clamp plate apertured to freely pass said upstanding stud and supported with one end in vertically spaced overhanging relation to the rim of said arcuate flange and a clamp nut threaded on the upper end of said stud for threaded movement into and out of engagement with said clamp plate to force said clamp plate end into clamping engagement with the rim of said arcuate flange.

7. The saw of claim 6 wherein said clamp block assembly includes a slide stop member having a slotted leg freely passing said upstanding stud and supported for sliding movement from an inoperative position to a position beneath the rim of said arcuate flange, spacer means encompassing said stud between said clamp plate and slotted leg for transmitting clamping pressure from said clamp plate to said slotted leg to fix said slide stop member in a selected one of its positions, and said arcuate flange includes angularly spaced, dependent rib structures beneath said rim forming indexing abutments cooperating with said slotted leg to determine the frequently used settings of the mitre gage.

8. The saw of claim 1 wherein said elongated blade opening provides inwardly directed support ears having tapped apertures therein normal to the work support surface of said work table to receive mounting screws, closure plate means including a blade slot therein and upwardly facing countersunk screw passages disposed to align with said tapped apertures is provided for closing said blade opening, said closure plate means is resiliently supported on said support ears through compressible elastomeric bushings apertured to pass the shanks of mounting screws provided to secure said closure plate means to said ears, and flat headed securing screws having shanks passing downwardly through said countersunk screw passages and said bushings and threaded into said tapped apertures are provided to secure said closure plate means to said ears and draw said closure plate means toward said ears upon tightening said screws from above the work table to individually compress said bushings to the degree necessary to level the surface of said closure plate means with the work support surface of said table.

9. A tilt bracket, saw blade arbor and motor assembly for a tilting arbor saw including a work support table having dependent front and rear trunnions fixed to its underside and an elongated through blade opening comprising a main bracket member having front and rear laterally directed trunnion protrusions at its opposite ends and an annular laterally directed opening lying between said trunnion protrusions with its axis in a plane intersecting said through blade opening at right angles adjacent an end thereof; a blade and arbor support means comprising a motor end bell journaled in said annular laterally directed opening of said main bracket member and including 1. an outer annular rim, 2. a radially inwardly coaxially disposed motor mounting ring fixedly connected to the interior of said outer annular rim by radially directed spokes one of which adjacent the outer rim is transversely enlarged and through bored to form a cylindrical through passage having an axis paralleling the outer annular rim axis and intersecting the through blade opening, and 3. an arbor bearing comprising an inner race fixedly mounting a blade arbor shaft with an end projecting beyond one end of said outer annular rim and an outer bearing mounted in said through bore; means fixing said motor end bell against axial movement with respect to said annular laterally directed opening; and an electric drive motor having a casing fixedly secured at one end to the end of said coaxially disposed motor mounting ring oppositely related to said one rim end with its rotor shaft extending from said one casing end through said mounting ring and beyond the other casing end.

10. The assembly of claim 9 wherein said motor casing adjacent and inwardly from said one end mounts a worm gear segment in radially outwardly disposed relation to said motor casing and said main bracket member, at the side thereof from which the motor casing protrudes, fixedly mounts a shaft journal bracket having spaced axially aligned journal bores lying in a plane defined by a radius of said worm gear segment, and a worm drive shaft is journaled in said journal bores in meshing engagement with said worm gear segment to effect bodily rotation of said motor end bell in said laterally directed opening to shift said blade arbor shaft toward and away from said support table elongated blade opening to provide a depth of cut adjustment.